Aug. 7, 1945.   J. H. FILBURN   2,381,815
HOLD DOWN DEVICE
Filed July 8, 1943
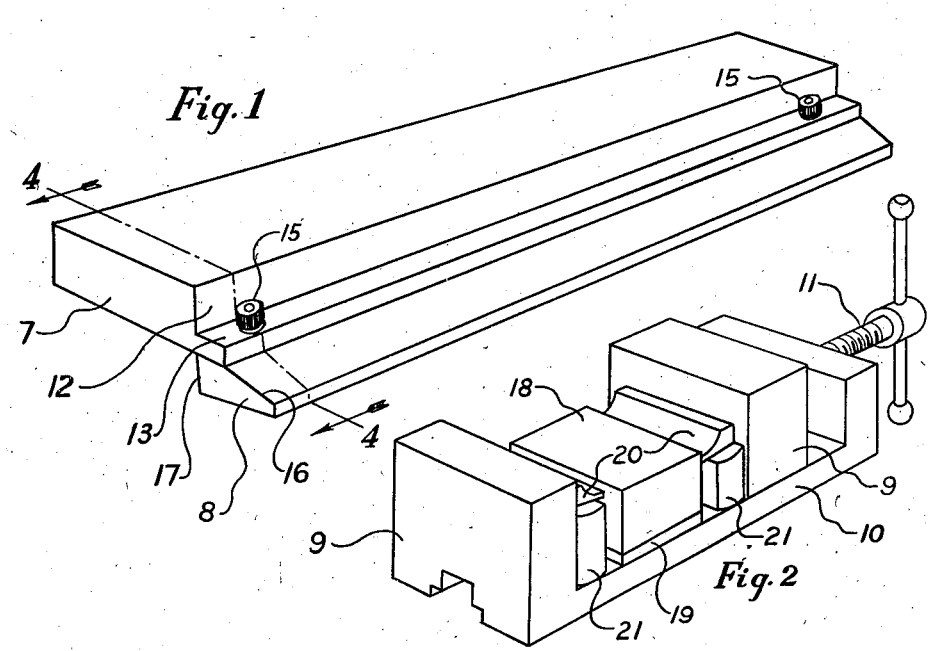
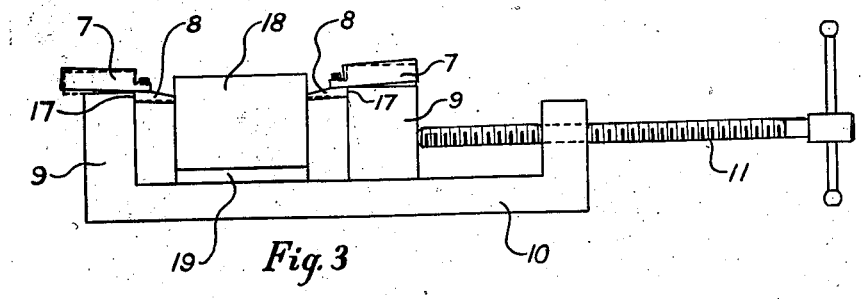
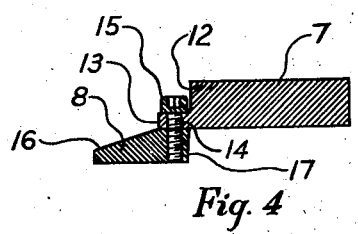
INVENTOR.
JOHN HENRY FILBURN
BY Edward M. Apple
ATTORNEY Patented Aug. 7, 1945

2,381,815

UNITED STATES PATENT OFFICE 2,381,815

HOLD-DOWN DEVICE

John Henry Filburn, Detroit, Mich.

Application July 8, 1943, Serial No. 493,885

2 Claims. (Cl. 90—60)

This invention relates to machinery and particularly to a hold down device to be used in connection with the vise of a milling machine or the like.

It has been the practice heretofore, in setting up work on a milling machine to use two sets of parallels. One set being used to align the hold down bars, and the other set being used to support the work piece.

It is an object, therefore, of the invention to provide a hold down device, which will obviate the necessity of using one set of parallels in setting up the work.

Another object of the invention is the provision of a device of the character referred to, which may be rested by its own weight directly on the jaws of the vise.

Another object of the invention is the provision of a device, which is simple in construction, economical to manufacture, and efficient in use.

The foregoing objects and other advantages of the invention will appear as the description proceeds, reference being made from time to time to the drawing forming part of this disclosure in which drawing:

Fig. 1 is a perspective view of a device embodying my invention.

Fig. 2 is a perspective view of a conventional milling machine vise, with a work piece set up, utilizing one pair of parallels to support the work piece, and another set of parallels for supporting the hold down members in the conventional manner.

Fig. 3 is a front elevational view of the same milling machine vise as shown in Fig. 2, with a work piece held in position by the applicant's improved hold down device.

Fig. 4 is a cross section taken substantially on the line 4—4 of Fig. 1.

Referring now more particularly to the drawing, it will be understood that in the embodiment herein disclosed (Fig. 1), my improved hold down device consists of a rest bar 7, and a pinch bar 8, which are formed and secured together as hereinafter described.

The rest bar 7, is preferably formed of rectangular bar stock of sufficient size and weight, so that it will rest of its own weight (Fig. 3) on top of the jaws 9, of the milling machine vise 10, the screw of which is designated by the reference character 11. I prefer to machine away a portion of the rest bar 7, as at 12, to provide the off set 13, which is drilled and threaded as at 14, to accommodate the Allen screws 15, which engage corresponding threaded bores in the pinch bar 8.

The pinch bar 8, is also preferably formed of rectangular bar stock of suitable size, which is machined as at 16, to provide a substantially 15 degree angle, and machined as at 17, to provide a substantially 4 degree angle. When the two bars are assembled as shown in Fig. 1, the device is ready for use, as shown in Fig. 3.

In Fig. 2, I illustrate the conventional method of setting up a work piece 18, which is supported by the parallels 19, and which is held down by the hold down members 20, which are in turn, supported by the parallels 21.

It will be noted in Fig. 3, however, that the work piece 18 is supported by the parallels 19 and is held down by the pinch bars 8, of applicant's hold down device, without the necessity of the second pair of parallels 21, as shown in Fig. 2.

When a work piece 18 is set up as shown in Fig. 3, and before the vise is tightened, applicant's hold down members will assume the positions indicated by the dotted lines because of the weight of the rest bars 7. As the vise is tightened, the inside faces of the jaws 9 will contact the four degree angular faces 17, causing the narrow edges of the pinch bars 8 to contact the work piece 18 and at the same time will rock upwardly the rest bars 7, as shown in Fig. 3.

It will thus be seen that I have provided a hold down device which is simple in construction and efficient in use.

Having described my invention what I claim and desire to secure by Letters Patent is:

1. The combination with a vise having a pair of jaws, of a hold down device comprising a counterweight rest bar adapted to rest of its own weight on the upper surface of each jaw, each of said rest bars being provided with an offset portion from which depends an angular pinch bar, said pinch bar having an inclined rear surface arranged to contact the vise jaw and cause the pinch bar to rock downwardly in an inclined position when the vise jaws are closed on a work piece.

2. The combination defined in claim 1, in which the pinch bar has a comparatively thin leading edge which, when the pinch bar is rocked downwardly, presents a sharp line contact between the pinch bar and a work piece.

JOHN HENRY FILBURN.